United States Patent [19]

Leboime

[11] Patent Number: 4,953,647

[45] Date of Patent: Sep. 4, 1990

[54] TRANSMISSION SYSTEMS FOR HIGH-SPEED TRACK-LAYING VEHICLES OR VEHICLES WITH NON-STEERABLE WHEELS

[75] Inventor: Pierre Leboime, Paris, France

[73] Assignee: Zone Industrielle d'Epluches, Saint-Ouen-l'Aumone, France

[21] Appl. No.: 406,718

[22] Filed: Sep. 13, 1989

[30] Foreign Application Priority Data

Sep. 14, 1988 [FR] France ................. 88 11967

[51] Int. Cl.⁵ .............. B62D 11/12; F16H 47/08
[52] U.S. Cl. ....................................... 180/9.1
[58] Field of Search ................. 180/9.1, 9, 9.2

[56] References Cited

FOREIGN PATENT DOCUMENTS 158411 10/1985 European Pat. Off. ......... 180/9.1
1953616 4/1971 Fed. Rep. of Germany ....... 180/9.1

Primary Examiner—Mitchell J. Hill

[57] ABSTRACT

A transmission for high-speed track-laying vehicles or vehicles with non-steerable wheels having an engine adapted to produce substantially constant power over a wide range of speeds comprises a gearbox and a hydrodynamic torque converter. The transmission further comprises reversing gearing and epicyclic output gears. A positive clutch couples the hydrodynamic torque converter to the gearbox output shaft. Two freewheel clutches are respectively driven by the vehicle engine and by the hydrodynamic torque converter. By this means the highest drive speed is selected at all times. The transmission further incorporates steering means adapted to procure continuous variation of the turning radius. The transmission is particularly suitable for tanks.

10 Claims, 2 Drawing Sheets

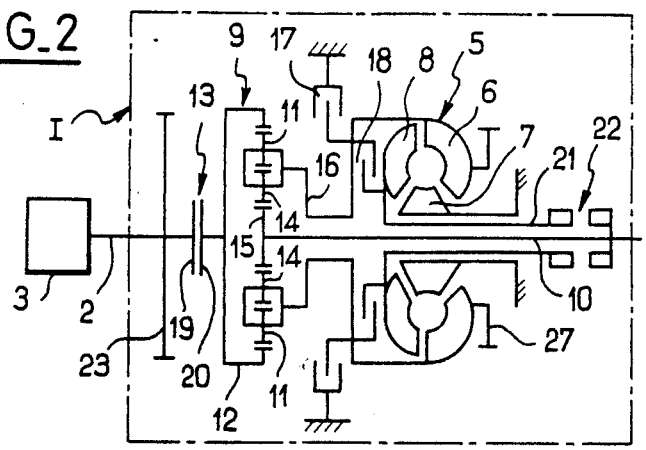
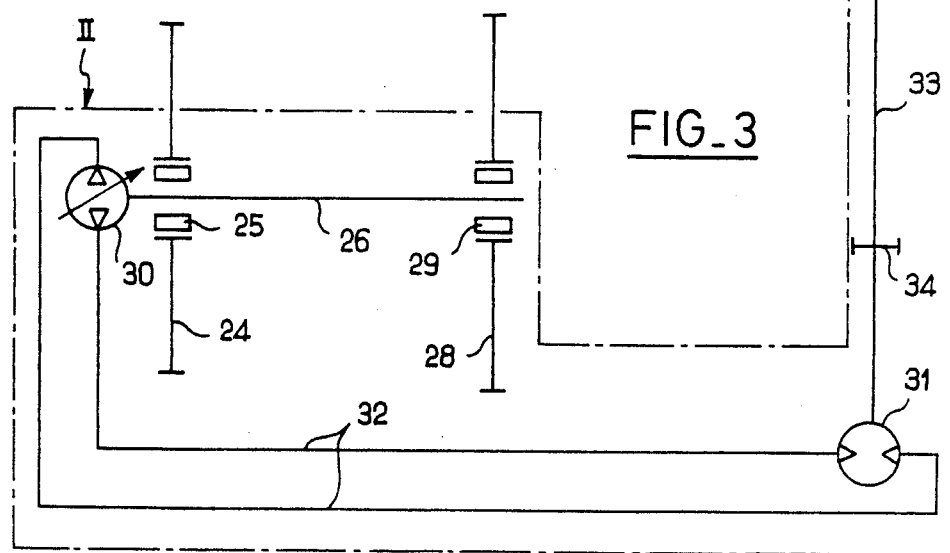
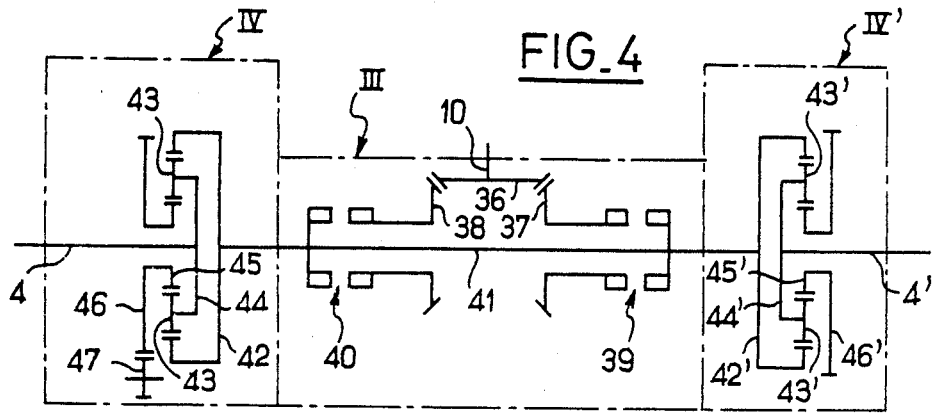

TRANSMISSION SYSTEMS FOR HIGH-SPEED TRACK-LAYING VEHICLES OR VEHICLES WITH NON-STEERABLE WHEELS

BACKGROUND OF THE INVENTION

1. Field of the Invention

The present invention concerns transmission systems for high-speed track-laying vehicles or vehicles with non-steerable wheels.

2. Description of the Prior Art

High-speed track-laying vehicles, generally intended for military uses, must as far as possible be capable of moving as fast as possible on roads, of crossing the most severe obstacles and of retaining under all circumstances the greatest possible mobility or "agility".

These vehicles must be capable of achieving speeds well in excess of 60 kph and even as high as 80 kph, which distinguishes them from other track-laying vehicles such as those used in public works, which as a general rule do not have to move as fast.

In both cases steering the vehicle is based on the general principle whereby the relative speed of the tracks is varied, but it will be readily understood that the transmission systems used are not designed in the same manner, given the much more severe conditions that prevail in the case of steering high-speed track-laying vehicles because of the high power that passes to the tracks. In the case of earthmoving plant, this power is always relatively modest.

What is more, accurate control at high speed requires a steering system procuring continuous variation of the turning radius.

For these reasons there is an increasing tendency to use for steering modern vehicles, and in particular tanks, hydrostatic transmission systems, in particular transmissions incorporating a variable delivery pump (with axial pistons and inclinable plate, or with inclinable or non-inclinable barrel) and a fixed capacity hydraulic motor. Fitting these is facilitated by the fact that the same oil can be used for the steering transmission and the gearbox, and this oil can be the same as that used for the diesel engine.

Thus there are known transmission systems for high-speed track-laying vehicles or vehicles with non-steerable wheels comprising a gearbox equipped with a hydrodynamic torque converter functioning in a power splitting arrangement, steering means featuring continuous variation of the turning radius and reversing gearing associated with epicyclic output gears.

Various techniques have already been put forward for improving the performance of known transmissions and reference may usefully be had to French patent applications Nos 2 450 189 and 2 602 481 from the same inventor as the present application and the contents of which are hereby incorporated by way of reference.

In French patent application No 2 450 189 it is proposed to use on the steering shaft a variable speed drive the primary of which is driven either from the primary of the torque converter of the transmission or from the secondary of this converter, according to which of these two members is rotating faster, so conferring on the vehicle the minimal turning radius.

In French patent application No 2 602 481 it is further proposed to provide a transmission with a single-output steering device: in this case the output of the gearbox is connected to the annulus gear of a first epicyclic gear (with fixed sun gear and planet carrier connected to the rotating part of the braking device) and the steering device comprises a rotary member coupled to the sun gear of a second epicyclic gear with the same ratio (with the planet carrier fastened to that of the first gear and an annulus gear connected to the motion output shaft which extends to the braking and steering devices).

The state of the art is further illustrated by French patents Nos. 2 606 713, 2 540 058, 2 468 790, 2 395 873 and 2 377 923, filed by this applicant, and British patents Nos. 1 456 717 and 2 006 899.

In parallel with this work there is considerable research on drive engines, especially on supercharged diesel engines.

In particular, researchers are attempting to develop turbines with separate combustion chambers driving a compressor ("hyperbar" system): as yet the cost of these solutions would seem to be prohibitive, however. A more promising line of research is into using two-stroke diesel engines: in particular it seems possible, by appropriately adapting the exhaust valves, to achieve a high degree of supercharging as a result of a higher pressure of the exhaust gas driving the supercharger turbine, even at low engine speeds, which results in constant power from speeds in the order of half the maximum speed.

An object of the invention is to provide a transmission that is particularly well suited to engines supplying constant power over a wide speed range, for example in a ratio of 1:2.

Another object of the invention is to provide a transmission of simple and rugged design enabling the number of gear ratios to be reduced while improving the performance of the vehicle using it.

A further object of the invention is to provide a transmission enabling three modes of operation to be established, apart from the neutral and braked neutral positions, the first of these modes being a power spitting mode, the second a direct drive mode and the third an overdrive mode.

SUMMARY OF THE INVENTION

The present invention consists in a transmission for high-speed track-laying vehicles or vehicles with non-steerable wheels having an engine adapted to produce substantially constant power over a wide range of speeds, the transmission comprising a gearbox equipped with a hydrodynamic torque converter, said hydrodynamic torque converter having a primary (pump) and a secondary (turbine) and functioning in a power splitting arrangement, an output shaft of said gearbox, steering means adapted to procure continuous variation of the turning radius, and a reversing gearing associated with epicyclic output gears, and further comprising a positive clutch coupling the secondary of said hydrodynamic torque converter to said gearbox output shaft, together with two freewheel clutches driving the said steering means, one of said freewheel clutches being driven by the vehicle engine whereas the other one is driven by the primary of said hydrodynamic converter, whereby the highest drive speed is selected at all times.

The gearbox preferably includes an epicyclic input gear at the input to the hydrodynamic torque converter with a ratio of approximately 2:1. This favors operation of the drive engine at constant power over the entire range of vehicle speeds (by comparison, the ratio of the gearboxes of conventional hydrodynamic torque converter transmissions between two consecutive gears is in the order of 1.6:1).

Specifically, the epicyclic input gear includes two families of planet pinions meshing with each other and one of which meshes with the annulus gear of the epicyclic input gear, which is adapted to be driven by the vehicle engine, and the other of which meshes with the sun gear of the epicylcic input gear, which is coupled to the gearbox output shaft, the planet carrier of the epicyclic input gear driving the primary of the hydrodynamic torque converter.

It is particularly advantageous to provide a clutch and a brake associated with the hydrodynamic torque converter, the primary of which can be stopped by the brake and/or coupled by the clutch to the secondary of the hydrodynamic torque converter.

In one particularly advantageous embodiment the transmission further comprises an actuator device associated with the positive clutch by which the positive clutch is always engaged except in a purely mechanical overdrive operating mode in which the brake is applied and the clutch is released. A structure of this kind is simple and rugged and, using modern synchronism detecting devices, makes it possible to dispense with a clutch (costly) or an additional freewheel (one-way) clutch (eliminating the engine brake).

It is advantageous for the steering means to incorporate a variable speed drive. Specifically, the variable speed drive comprises a hydrostatic transmission including a variable delivery pump having an input shaft driven by the two freewheel clutches, which are mounted on the input shaft, and a fixed capacity hydraulic motor, the transmission further comprising a steering shaft through which the hydraulic motor drives the epicyclic output gears. A solution of this kind makes it possible to avoid adding excessive weight to the transmission (an electrical system would be heavier for equal power than the aforementioned plus pump hydraulic motor system).

The reversing gearing preferably comprises a conical triad connected to the gearbox output shaft and to the epicyclic output gears, which results in a compact and rugged structure; specifically, the transmission further comprises forward and reverse positive clutches associated with the reversing gearing and by which the reversing gearing is coupled to the epicyclic output gear.

It is particularly advantageous for the transmission to comprise a drive clutch having a primary adapted to be driven by the vehicle engine and a secondary driving the annulus gear of the epicyclic input gear, means being provided to release the drive clutch in the neutral or the braked neutral or the direction selection position independently of the state of the brake or clutch associated with the hydrodynamic torque converter or of the state of the positive clutches respectively coupling the gearbox to the reversing gearing and the reversing gearing to the epicyclic output gears.

Other characteristics and advantages of the invention will emerge more clearly from the following description and the appended drawings relating to one specific embodiment.

BRIEF DESCRIPTION OF THE DRAWINGS

FIG. 2 reproduces part of FIG. 1 showing the subsystem corresponding to the gearbox of the transmission.

FIG. 3 reproduces another part of FIG. 1 showing the subsystem II corresponding to the steering means.

FIG. 4 reproduces a further part of FIG. 1 showing the subsystem III corresponding to the reversing gearing and the associated subsystems IV and IV' corresponding to the output epicyclic gears.

DESCRIPTION OF THE PREFERRED EMBODIMENT

Figure 1:
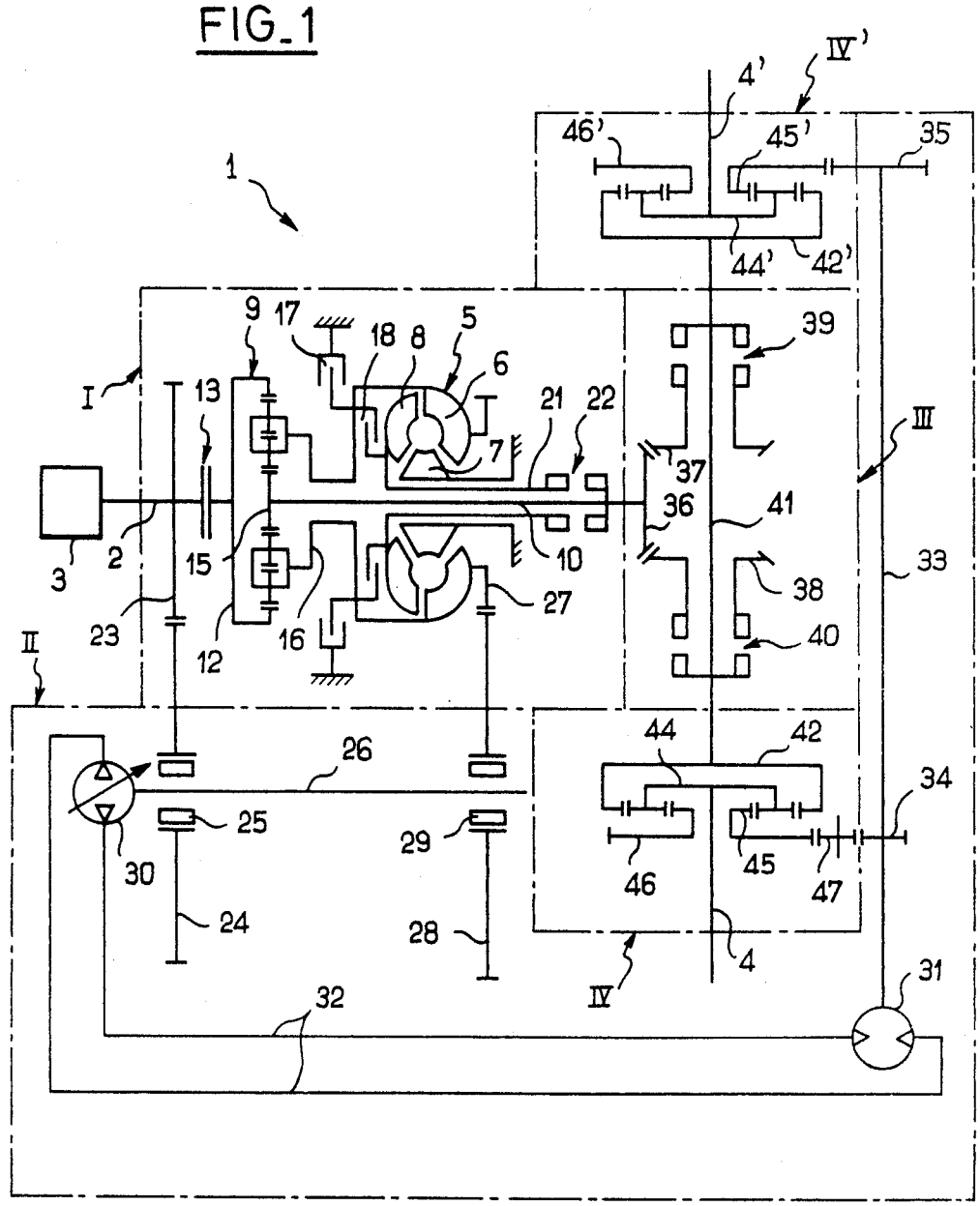
FIG. 1 is a schematic showing a transmission in accordance with the invention in which the functional subsystems are indicated within chain-dotted rectangles.

To make the description clearer and more logical, the transmission 1 shown in FIG. 1 has been broken down into different functional subsystems I, II, III, IV and IV' which will be described in succession with reference to the corresponding FIG. 2, 3 or 4, from the input shaft 2 of the transmission connected to the drive motor 3 of the vehicle to the output shafts 4, 4' connected to the sprocket wheels driving the tracks of said vehicle.

It should be noted that the various component parts of the transmission are individually well known to those skilled in the art, and for this reason they will be described only briefly.

As emerges from the figures, the gearbox of the transmission 1 is of a particularly simple design, which results partly from the fact that the drive engine 3 is an engine supplying essentially constant power over a wide range of speeds, for example in the ratio of 1:2.

The arrangement of this transmission makes it possible to reduce the number of gear ratios and to improve the performance of the vehicle. If the ratio of the gearbox between two consecutive gears is around 2:1 the drive engine 3 operates at constant power over all the range of speeds of the vehicle, and in particular up to speeds as high as 80 kph.

The subsystem I includes a hydrodynamic torque converter 5 for starting the vehicle and providing the necessary multiplication of the torque at low speeds. The reader is reminded that the type of vehicle that the inventive transmission concerns implies a transmission spread (the ratio between the possible traction force on starting and that at maximum speed) with a value of around 10.

The hydrodynamic converter 5 shown here is of known design but the way it is used differs substantially from that of existing transmissions, as will emerge later.

The schematic representation of the hydrodynamic torque converter 5 shows a primary 6 (pump), a set of reaction blades 7 and a secondary 8 (turbine), the output torque being the sum of the input and reaction torques.

In the first mode the aim is to use the known principle of power splitting at the input to the hydrodynamic converter 5, combined with the fact that the drive motor, at constant power, must turn at substantially half its speed (but already at maximum power). It is therefore a question of multiplying by a factor of approximately 2 the speed of the converter 5, which must therefore turn at its nominal speed. For this purpose differential type means are employed with ratio of 2:1. A conical differential could be used, but it is simpler to provide an epicyclic gear with two families of planet pinions meshing together, one family meshing with the annulus gear connected to the drive engine and the other family with the sun gear coupled to the gearbox output shaft.

There is shown here a transmission 1 incorporating an epicyclic (or planetary) gear 9 of the aforementioned type. The component parts of the epicyclic gear 9 are not given reference numbers in FIG. 1 in order to clarify the diagram, except for the output shaft 10 driven by said epicyclic gear. It is therefore necessary to refer to FIG. 2 which shows the planet pinions 11 of a first family meshing with the annulus gear 12 which is coupled to the drive engine (through the intermediary of a drive clutch 13 as will emerge later); FIG. 2 also shows planet pinions 14 of a second family meshing with the sun gear 15 which is coupled to the output shaft 10. The two families 11, 14 of planet pinions meshing together are located on a planet carrier 16 which is driven via a coupling to the primary 6 of the hydrodynamic torque converter 5.

There is further provided a brake 17 for the power splitting function, for example a jaw or multiple-disk type brake, capable of stopping the primary 6 of the hydrodynamic torque converter, together with a clutch 18, a disk clutch, for example, capable of coupling the primary 6 to the turbine constituting the secondary 8 of said converter. It should be noted that the aforementioned brake 17 and clutch 18 can be operated separately, so that the primary 6 of the converter can be stopped by the associated brake 17 and/or coupled to the secondary 8 by the associated clutch 18. The same goes for the drive clutch 13, the primary 19 of which is driven by the input shaft 2 and the secondary 20 of which drives the annulus gear 12 of the epicyclic gear 9. This will emerge even more clearly from the explanations given later with reference to the functioning of the transmission.

One essential feature of the inventive transmission is that the secondary 8 of the hydrodynamic torque converter 5 is coupled to the output shaft 10 through the intermediary of a positive clutch; FIGS. 1 and 2 show the coupling between the output shaft 10 and a coaxial shaft 21 coupled to the secondary 8 by a positive clutch 22.

The positive clutch 22 will be associated with any known actuator device (mechanical, hydraulic or pneumatic) so that it is always engaged except in the third mode of operation, which is purely mechanical, corresponding to an overdrive mode in which the brake 17 is applied but the clutch 18 is released, as will be explained in more detail in relation to the general functioning of the transmission.

A positive clutch coupling of this kind is particularly advantageous as it makes it possible to simplify the overall design by dispensing with members such as a clutch (costly) or a freewheel (one-way) clutch (eliminating the engine brake) and simply by making use of modern, very efficient synchronism detecting devices; it is further possible to provide an engine brake that is very useful in the first and second operating modes (see below for explanations regarding the various operating modes).

In this way it is possible to use only two sliding members (the brake 17 and the clutch 18 associated with the hydrodynamic converter 5), which is highly advantageous with regard to the simplicity and reliability of the system.

Another fundamental feature of the invention is the drive coupling to the steering means procuring continuous variation of the turning radius.

It should be noted that the steering means represented by the subsystem II of FIGS. 1 and 3 incorporate in this instance a variable speed drive which is implemented in the form of a classic hydrostatic transmission made up of a variable delivery pump and a fixed capacity hydraulic motor: this is merely a preferred example, however, it being understood that it will be possible to use an electrical system with a generator and a motor (although in the current state of the art this would result in a much heavier structure).

The novelty of the inventive transmission resides in the arrangement of the coupling between the subsystems I and II, as described hereinafter.

A gear 23 on the input shaft 2 cooperates with a gear 24 mounted through the intermediary of a first freewheel clutch 25 on a shaft 26 driving the variable delivery pump of the steering means (pump 30): this enables the steering means to be driven via a first freewheel clutch 25 which is driven by the engine 3. A gear 27 fastened to the primary 6 of the hydrodynamic torque converter 5 cooperates with a gear 28 also mounted, through the intermediary of a second freewheel clutch 29, on the shaft 26 driving the pump 30: the latter therefore enables the steering means to be driven by a second freewheel clutch 29 which is driven by the primary 6 of the hydrodynamic torque converter, which primary is coupled to the planet carrier of the epicyclic input gear 5.

An arrangement of this kind therefore makes it possible to choose at all times the highest drive speed for the steering means.

The combination of the aforementioned essential features (association of an engine offering essentially constant power over the speed range, positive clutch coupling of the converter secondary to the output of the gearbox and driving of the steering means through two freewheel clutches (one of which is driven by the engine and the other of which is driven by the primary of the converter) makes it possible to produce a transmission perfectly suited to all-terrain track-laying vehicles and which is simple and rugged.

The steering means constituted by the subsystem II further comprise, in the conventional way, a hydraulic circuit 32 connecting the variable delivery pump 30 to the fixed capacity hydraulic motor 31. The hydraulic motor 31 drives a steering shaft 33 operating on the sun gears of the output reduction gears (subsystems IV and IV') through the intermediary of associated gears such as the gears 34 and 35.

As can be seen in FIGS. 1 and 4, the transmission is completed by reversing gearing (subsystem III) and by two epicyclic output gears (subsystems IV and IV'), in an entirely conventional way.

The reversing gearing is in the form of a conical triad (gear 36 fastened to the output shaft 10 and associated gears 37, 38). Other solutions could be used, however, for example a conical system associated with reversing gearing having five straight gears; the variant shown has the advantage of simplicity, however.

The reversing gearing communicates motion to an associated transverse shaft 41 by any appropriate means: here there is shown a forward positive clutch 39 and a reverse positive clutch 40, but strictly speaking progressive clutches could be used in place of these positive clutches.

The shaft 41 is coupled to the two epicyclic output gears in the conventional way.

The gear represented by the subsystem IV comprises, as shown in FIG. 4, an annulus gear 42 coupled to the shaft 41, a family of planet pinions 43 on a planet carrier 44 coupled to the output shaft 44. The sun gear 45 of the output gear carries a gear 46 coupled to the steering shaft 33 through the intermediary of a gear 47. The gear represented by the subsystem IV' is identical (except for the gear 47), which is why its component parts have been given the same reference numbers but with a prime.

Before describing the functioning of the inventive transmission in more detail, with its various modes and the changes between them, it is necessary to point out that the drive clutch 13, the primary of which is driven by the input shaft 2 and the secondary of which drives the annulus gear of the epicyclic gear of the gearbox, may be released in the neutral position (braked or otherwise) or in the direction selection position independently of the operation of the brake 17 and/or the clutch 18 associated with the primary of the hydrodynamic converter 5 and the operation of the positive clutch 22 coupling the gearbox to the reversing gearing and of the positive clutches 39, 40 coupling the reversing gearing to the epicyclic output gear.

Consider now the various possible situations.

Neutral

In the neutral position the drive clutch 13 is released as are the clutch 18 and the brake 17 associated with the hydrodynamic converter 5; the positive clutches 39, 40 are open but the positive clutch 22 is engaged.

Thus with the exception of the positive clutch 22 all the component parts of the transmission are open in the neutral position.

Braked Neutral

This situation is specific to track-laying vehicles such as tanks: it enables the tank to turn on itself, pivoting about a vertical median axis.

In this position all the elements are engaged, except of course for the drive clutch 13, in order to immobilize totally the shaft 41: the clutch 18 and the brake 17 associated with the hydrodynamic converter 5 are engaged, the positive clutch 22 remains engaged and one or other of the direction positive clutches 39 or 40 is engaged. The vehicle then turns readily on itself using the steering means driven by the shaft 2 (without the gearbox halted by the brake 17 being driven, since the drive clutch 13 is open).

The maneuver is easy and flexible, even on a slope.

Reversing or Selecting Direction (From Neutral)

The component parts of the transmission are in the same position as previously.

With the vehicle stopped, the "braked neutral" maneuver is initiated rapidly and one of the positive clutches 39 or 40 is therefore engaged, as appropriate to the required direction, the other positive clutch being released if it was previously engaged.

The same applies in the case of reversing the direction.

First Mode

Once the direction is chosen the first mode is entered from the neutral position.

In this situation the drive clutch 13 is operated; the positive clutch 22 remains engaged while the clutch 18 and the brake 17 associated with the hydrodynamic converter 5 are released. The positive clutch 39 or 40 corresponding to the direction already chosen naturally remains engaged.

By virtue of the converter the gearbox then functions as a hydrodynamic power splitter, which enables the vehicle to start and provides the necessary multiplication of the torque at low speeds. With the power split the motor can run at a speed between half its maximum speed (for example, 1 200 rpm) and a speed approaching the maximum speed and depending essentially on the characteristics of the converter (2 200 to 2 300 rpm approximately).

Thus in the first mode when the vehicle is started the converter is driven with the multiplication ratio (of nearly 2:1) provided by the epicyclic input gear, the sun gear of which starts with the vehicle; the engine is then loaded by the converter and is initially held at half-speed.

As the vehicle accelerates the engine can turn faster and faster while the primary of the converter turns at substantially the same speed (for example, 2 600 to 3 000 rpm).

As the steering means are driven by freewheel clutches they are in the first mode driven by the pair of gears 27, 28 and the freewheel clutch 29 as these are naturally the components turning the fastest.

If required, the direct drive mode of the converter may be selected to select drive mode of the converter may be selected to select the second mode in order to reduce the engine speed to approximately half-speed.

Second Mode

The second operating mode corresponds to direct drive, the hydrodynamic converter no longer contributing to the transmission of power.

In this situation the drive clutch 13 is naturally still operating and the positive clutch 22 and the positive clutch 39 or 40 (as appropriate) remain engaged; the difference as compared with the previous mode resides in the operation of the clutch 18 associated with the converter, which "bridges" said converter (the brake 17 then remains released).

This mode of operation is purely mechanical, as the hydrodynamic converter 5 rotates with the engine.

In this case the steering means are driven by the two freewheel clutches 25 and 29.

At the end of the second mode the engine will have again reached its maximum speed.

For changing up the change from the first to the second mode is performed by operating only the clutch 18, which cancels out the slip of the converter, and reduces the engine speed to half the maximum speed. The changeover point will be chosen as appropriate to the characteristics of the converter, so that the engine is actually at half-speed.

Conversely, on changing down, the changeover from the second mode to the first mode is easily achieved by simply releasing the clutch 18 (the change from the first mode to the second mode and vice versa is of the "powershift" type, that is to say it does not interrupt the traction force).

Third Mode

The third operating mode corresponds to a purely mechanical overdrive mode exploiting the fact that the epicyclic input gear 9 has a ratio in the vicinity of 2:1. The engine can run up to speed again and drive the vehicle at its maximum speed.

In this situation the drive clutch 13 is still operated but the clutch 18 associated with the converter is released and the brake 17 is applied. The positive clutch 39 or 40 remains engaged but the positive clutch 22 is open.

The annulus gear of the epicyclic input gear 9 is stopped by the brake 17 so that it is possible to stop the input to the hydrodynamic torque converter 5 the secondary of which is decoupled from the output of the transmission because the positive clutch 22 is open.

In this case the steering means are driven by the pair of gears 23, 24 and the freewheel clutch 25, as these are turning the fastest.

The engine, the speed of which has again dropped to half-speed on changing from the second to the third mode, can in this overdrive mode double the speed of the vehicle by returning to its maximum speed.

On changing up the changeover from the second to the third mode is effected by releasing the clutch 18 and applying the brake 17, the consequence of which is to establish, through the epicyclic input gear 9, a ratio of approximately 2:1 between the drive shaft 2 and the output shaft 10: this therefore reduces the engine speed to half-speed. At the same time the positive clutch 22 is naturally open to decouple the output of the hydrodynamic torque converter 5 from the output shaft 10 (if this positive clutch were not released the vehicle would be braked).

Conversely, to change down from the third mode to the second mode, after releasing the brake 17 and engaging the clutch 18 the engine is accelerated to its maximum speed to bring about synchronization and the positive clutch 22 is then re-engaged. In practise synchronization can be controlled by a microprocessor-based computer controlling automatic mode changing.

The invention is not limited to the embodiments that have just been described but to the contrary encompasses any variant thereof using equivalent means to achieve the essential characteristics as specified in the claims. Specifically, there have been described and shown only the essential active components of the inventive transmission although it goes without saying that for reasons of architecture or technology it would be possible to provide one or more intermediate gears between these various components.

I claim:

1. Transmission for high-speed track-laying vehicles or vehicles with non-steerable wheels having an engine adapted to produce substantially constant power over a wide range of speeds, said transmission comprising a gearbox equipped with a hydrodynamic torque converter, said hydrodynamic torque converter having a primary (pump) and a secondary (turbine) and functioning in a power splitting arrangement, an output shaft of said gearbox, steering means adapted to procure continuous variation of the turning radius, and a reversing gearing associated with epicyclic output gears, and further comprising a positive clutch coupling the secondary of said hydrodynamic torque converter to said gearbox output shaft, together with two freewheel clutches driving the said steering means, one of said freewheel clutches being driven by the vehicle engine whereas the other one is driven by the primary of said hydrodynamic converter, whereby the highest drive speed is selected at all times.

2. Transmission according to claim 1 wherein said gearbox includes an epicyclic input gear at the input to said hydrodynamic torque converter with a ratio of approximately 2:1.

3. Transmission according to claim 2 wherein said epicyclic input gear includes two families of planet pinions meshing with each other and one of which meshes with the annulus gear of said epicyclic input gear, which is adapted to be driven by the vehicle engine, and the other of which meshes with the sun gear of said epicyclic input gear, which is coupled to said gearbox output shaft, the planet carrier of said epicyclic input gear driving the primary of said hydrodynamic torque converter.

4. Transmission according to claim 1 comprising a clutch and a brake associated with said hydrodynamic torque converter, the primary of which can be stopped by said brake and/or coupled by said clutch to the secondary of said hydrodynamic torque converter.

5. Transmission according to claim 4 further comprising an actuator device associated with said positive clutch whereby said positive clutch is always engaged except in a purely mechanical overdrive operating mode in which said brake is applied and said clutch is released.

6. Transmission according to claim 1 wherein said steering means incorporate a variable speed drive.

7. Transmission according to claim 6 wherein said variable speed drive comprises a hydrostatic transmission including a variable delivery pump having an input shaft driven by said two freewheel clutches, which are mounted on said input shaft, and a fixed capacity hydraulic motor, and further comprising a steering shaft through which said hydraulic motor drives said epicyclic output gears.

8. Transmission according to claim 1 wherein said reversing gearing comprises a conical triad connected to said gearbox output shaft and to said epicyclic output gears.

9. Transmission according to claim 8 further comprising forward and reverse positive clutches associated with said reversing gearing and by which said reversing gearing is coupled to said epicyclic output gears.

10. Transmission according to claim 9 comprising a clutch and a brake associated with said hydrodynamic torque converter, the primary of which can be stopped by said brake and/or coupled by said clutch to the secondary of said hydrodynamic torque converter, and further comprising a drive clutch having a primary adapted to be driven by the vehicle engine and a secondary driving the annulus gear of said epicyclic input gear, means being provided to release said drive clutch in the neutral or the braked neutral or the direction selection position independently of the state of said brake or clutch associated with said hydrodynamic torque converter or of the state of said positive clutches respectively coupling said gearbox to said reversing gearing and said reversing gearing to said epicyclic output gears.

* * * * *

UNITED STATES PATENT AND TRADEMARK OFFICE
CERTIFICATE OF CORRECTION

PATENT NO. : 4,953,647
DATED : September 4, 1990
INVENTOR(S) : Pierre Leboime It is certified that error appears in the above-identified patent and that said Letters Patent is hereby corrected as shown below:

On the title page:

Assignee: "Zone Industrielle d'Epluches," should read --Societe D'Equipements Systemes Et Mecanismes--.

Signed and Sealed this

Sixth Day of October, 1992

*Attest:*

DOUGLAS B. COMER

*Attesting Officer*     *Acting Commissioner of Patents and Trademarks*